D. MATTHEW.
Steps and Bearings for Mill-Spindles.
No. 157,289.  Patented Dec. 1, 1874.
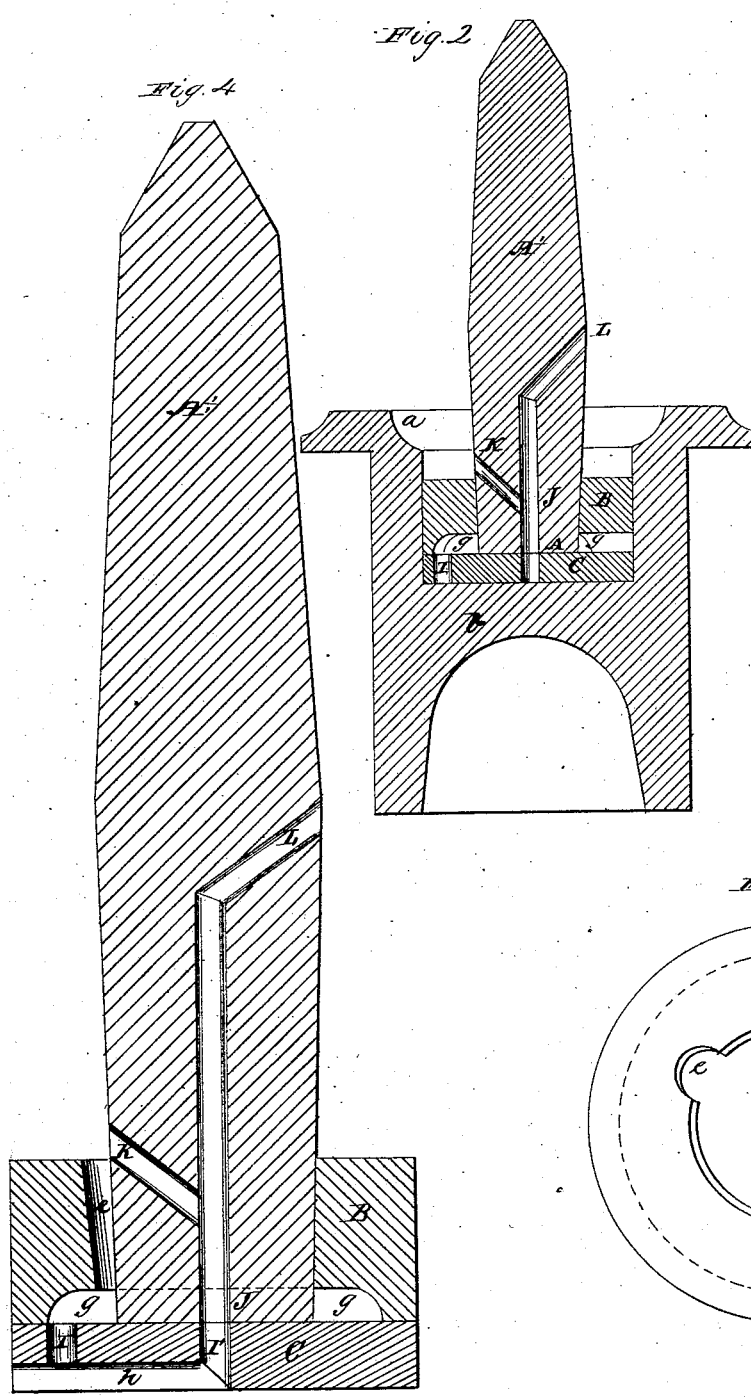
Witnesses:
N. M. Matthew
C. Matthew
Inventor:
Daniel Matthew

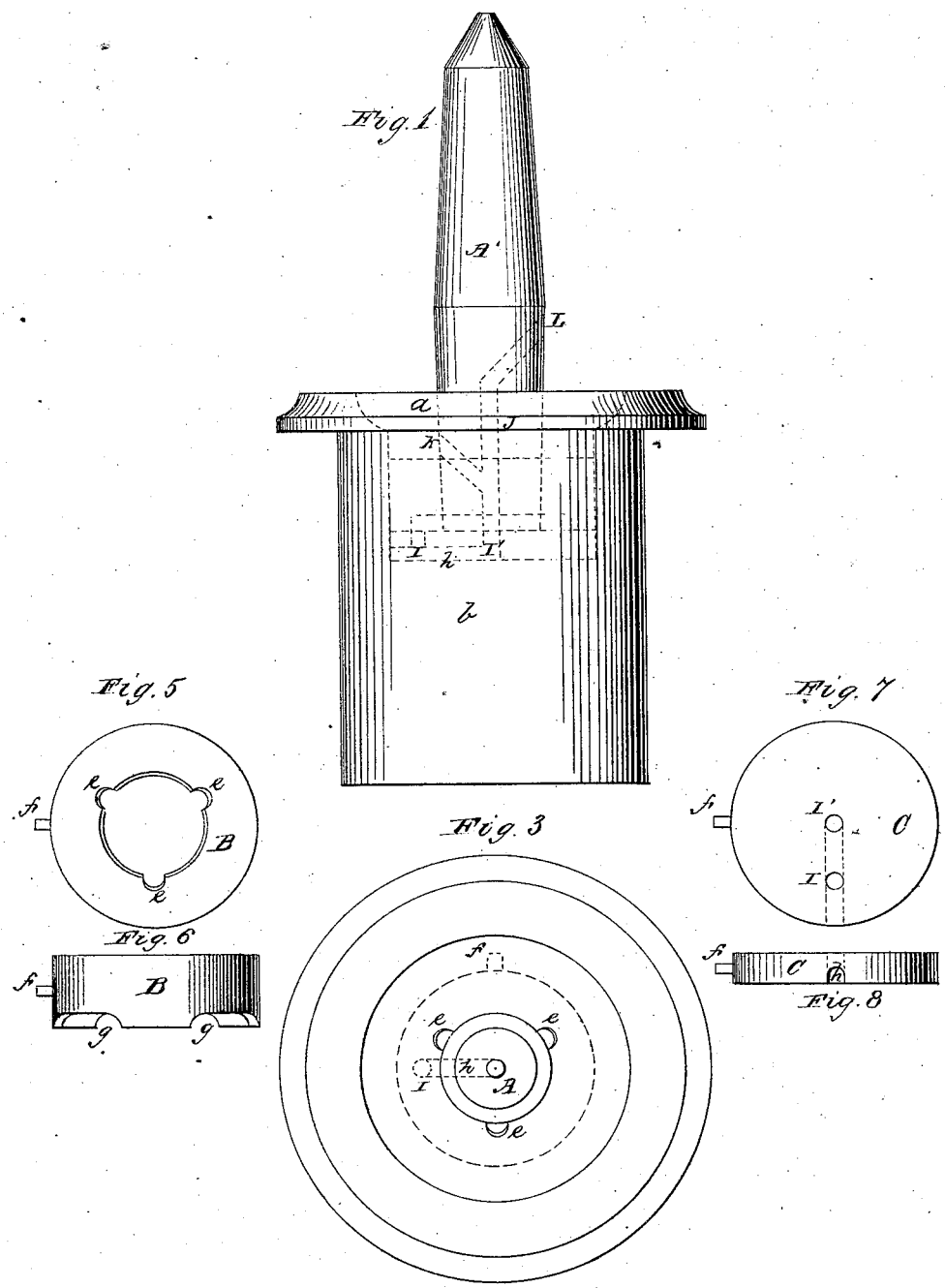
D. MATTHEW.
Steps and Bearings for Mill-Spindles.
No. 157,289. Patented Dec. 1, 1874.

UNITED STATES PATENT OFFICE.

DAVID MATTHEW, OF PORTLAND, OREGON.

IMPROVEMENT IN STEPS AND BEARINGS FOR MILL-SPINDLES.

Specification forming part of Letters Patent No. 157,289, dated December 1, 1874; application filed August 15, 1874.

*To all whom it may concern:*

Be it known that I, DAVID MATTHEW, of the city of Portland and State of Oregon, have invented a new and useful Improvement in Steps and Bearings of Mill-Spindles and Upright Shafts, and that the following is a full, clear, and exact description of the same, reference being had to the accompanying drawing and to the letters of reference thereon.

Like letters in different figures indicate like parts.

The nature of my improvement consists in the manner of proportioning the wearing and non-wearing surfaces in the steps and bearings, so that the non-wearing and bearing surfaces shall always keep a portion of the surface of the bearing exposed to the oil, and shall constantly keep changing from the bearing and non-bearing surface, whereby the whole surface is constantly changed and lubricated in its revolution and motion. Also, in passing a current of oil through the center of the bearing, so as to carry the lubricating fluid to that point, and to cause it to move or distribute it from the center outward with the motion of the upright shaft or spindle. Also, in carrying off the heat from the center of the step and bearing, thereby aiding in keeping it cool and well lubricated, so long as there is a supply of oil kept in the bearing or box at its disposal.

Figure 1 is a side view of step, box, and bearing of mill-spindle. Fig. 2 is a vertical section through center of mill-spindle, step, bearings, and box. Fig. 3 is a top view of the mill-spindle, step, box, and bearing. Fig. 4 is a section through the step and bearing removed from its seat. Fig. 5 is a top view of bearing B removed. Fig. 6 is a side view of B removed. Fig. 7 is a top view of C removed. Fig. 8 is an edge view of C removed. Fig. 9 is a top view of B removed.

*a*, the bead-plate for the adjustable bearing-box; *b*, the bearing-box that receives the vertical moving bearing and the step, and is adjustable vertically. A' is the mill-spindle; A, the step, and B the bearing for step, and C the bottom bearing for A. Step A has a center hole running up into it, with two inclined holes, K L, connecting with the center hole J to form a current through the center, the upper one to let off the heat, and the lower to let off the oil, up or down, as the case may require, always keeping oil at the center to distribute it over the wearing-surface, and to let off the internal heat at the center of the bearing B, the side bearing for the step A, and has three slots or grooves, *e e e*, through it, removing so much of the bearing or wearing surface, and making that much lubricating surface, and making three channels for the oil between the two bearings and wearing surfaces, thereby keeping up a perfect circulation of oil to keep the vertical surface cool and lubricated. *f* is a feather, to work into a groove in *c*, to prevent it turning. *g* is an oil-space between B and C. C has a center hole through it, also a groove on one side, with a side hole to make an oil-channel to connect with the oil-channel in A and B, I, I, *h*, J, K, and L, all forming united oil-channels, from the outside to the center, and from the center up and out of the top, all for the better passage of oil and heat from the center.

Having thus described the several parts of my invention I will now describe the operation of it.

When the apparatus is all constructed and put together, as here described, the spindle put in motion, and the box or step filled with oil, the step cannot wear down so as to exclude the oil from its surface, as the oil-channels extend horizontally to the center, and to all parts vertically, also having a center vent or cooler to let off the heat and keep the center cool. Where in the old or usual way the center gets dry, and commences to heat and cut, it having neither oiling nor cooling channels, it increases till it becomes heated, expanded, and destroyed, while the heat is confined in the center.

I claim as new, and desire to secure by Letters Patent—

1. The combination of the step-bearings B and C, with the grooves *e e e*, as and for the purpose herein set forth.

2. The step A', bearing B and C, with the grooves *g g*, and channels or holes I *h* I and J K L, as and for the purpose herein set forth, or their equivalent.

DAVID MATTHEW.

Witnesses:
  O. S. PHELPS,
  N. M. MATTHEW.